US010808897B2

(12) United States Patent
Wijaya et al.

(10) Patent No.: US 10,808,897 B2
(45) Date of Patent: Oct. 20, 2020

(54) SOLAR LIGHT DEVICE WITH CABLE ORGANIZER

(71) Applicant: Forever Gifts, Inc., Arlington, TX (US)

(72) Inventors: Hendra Wijaya, Arlington, TX (US); Marcus Pestl, Dallas, TX (US)

(73) Assignee: Forever Gifts, Inc., Arlington, TX (US)

( * ) Notice: Subject to any disclaimer, the term of this patent is extended or adjusted under 35 U.S.C. 154(b) by 115 days.

(21) Appl. No.: 15/863,563

(22) Filed: Jan. 5, 2018

(65) Prior Publication Data
US 2019/0211985 A1 Jul. 11, 2019

(51) Int. Cl.
| F21S 9/03 | (2006.01) |
| F21V 21/14 | (2006.01) |
| F21V 23/00 | (2015.01) |
| F21V 21/08 | (2006.01) |
| H02G 11/02 | (2006.01) |

(52) U.S. Cl.
CPC .......... *F21S 9/032* (2013.01); *F21V 21/0824* (2013.01); *F21V 21/14* (2013.01); *F21V 23/001* (2013.01); *H02G 11/02* (2013.01)

(58) Field of Classification Search
CPC .. F21V 27/00; F21V 21/0965; F21V 23/0414; F24S 20/20
See application file for complete search history.

(56) References Cited

U.S. PATENT DOCUMENTS

| 3,782,654 | A | * | 1/1974 | Kasa | B65H 75/38 242/388.1 |
| 4,384,317 | A | * | 5/1983 | Stackpole | F21S 9/032 136/291 |
| 4,751,622 | A | * | 6/1988 | Williams | F21S 9/035 136/291 |
| 4,984,139 | A | * | 1/1991 | Goggia | F21S 8/022 362/153.1 |
| 5,398,026 | A | * | 3/1995 | Handsaker | B60Q 1/2657 114/343 |
| 6,004,002 | A | * | 12/1999 | Giannone | F21S 9/032 362/183 |
| 6,142,439 | A | * | 11/2000 | Aramaki | B66D 1/60 248/327 |
| 6,290,367 | B1 | * | 9/2001 | Greenhoe | F21L 4/00 362/183 |
| 6,612,713 | B1 | * | 9/2003 | Kuelbs | A45B 3/00 362/102 |
| 7,021,787 | B1 | * | 4/2006 | Kuelbs | A45B 3/04 362/183 |
| 7,441,924 | B1 | * | 10/2008 | Thames | F21V 27/00 362/258 |

(Continued)

Primary Examiner — Tsion Tumebo
(74) Attorney, Agent, or Firm — Kirby Drake (57) ABSTRACT

A solar light device may provide a solar panel and at least one light. The solar light device may be mounted to a support member, staked in the ground, or fixed in a position for casting light. A cable may connect the solar panel and the at least one light or a plurality of lights, and the cable may house components that may provide electric current distribution. The cable may be retractable and may have a length that may be a minimum length required to mount and operate the solar light device or components thereof. A power source may be provided inside of the solar panel and may be rechargeable.

18 Claims, 5 Drawing Sheets

(56) References Cited

U.S. PATENT DOCUMENTS

| | | | | |
|---|---|---|---|---|
| 7,524,079 B2* | 4/2009 | Greenhoe | ............... | F21S 9/032 |
| | | | | 362/183 |
| 7,661,838 B2* | 2/2010 | Chen | ...................... | F21S 9/035 |
| | | | | 362/153 |
| 8,348,453 B2* | 1/2013 | Cumberland | ........... | F21S 8/036 |
| | | | | 362/192 |
| 8,596,822 B2 | 12/2013 | Kountotsis | | |
| 8,919,041 B2 | 12/2014 | Topping | | |
| 10,230,200 B1* | 3/2019 | Tomasko | ................ | H01R 13/72 |
| 2007/0002561 A1* | 1/2007 | Tesmer | ................... | F21S 9/035 |
| | | | | 362/183 |
| 2007/0171634 A1* | 7/2007 | Kao | ........................ | F21S 9/032 |
| | | | | 362/192 |
| 2007/0189023 A1 | 8/2007 | Rogers | | |
| 2008/0210289 A1* | 9/2008 | Chen | ........................ | H02S 20/00 |
| | | | | 136/244 |
| 2010/0008077 A1* | 1/2010 | Ponamar | ................. | F21S 9/032 |
| | | | | 362/183 |
| 2013/0126809 A1* | 5/2013 | Britten | ...................... | G09F 7/18 |
| | | | | 254/385 |
| 2014/0347873 A1* | 11/2014 | Robertson | ................ | F21L 4/08 |
| | | | | 362/485 |
| 2015/0215587 A1* | 7/2015 | Carpoff | ................... | F21L 13/00 |
| | | | | 348/143 |
| 2018/0103788 A1* | 4/2018 | Kitchen | ................. | F21V 23/06 |

* cited by examiner

SOLAR LIGHT DEVICE WITH CABLE ORGANIZER

TECHNICAL FIELD

The disclosure relates generally to a solar light device. In particular, the disclosure relates to a solar light device that provides a cable organizer.

BACKGROUND

Solar panels can be utilized to provide power to lighting systems. Long cables can connect the solar panels to components of lighting systems. Cables can have a longer length than needed, become tangled, and can become a nuisance to users and installers. The arrangement of solar panels and cables can limit where lighting systems are mounted or placed and can cause difficulty in operating lighting systems.

SUMMARY

Embodiments of the present disclosure may provide a solar light device that may include a solar panel and a light. The solar panel may have a winding mechanism, and the winding mechanism may be provided to store a retractable cable. The light may be attached to the solar panel by opposite ends of the retractable cable. The solar panel may be adjustable and may provide a 360-degree range of motion. The light may be adjustable and may provide a 360-degree range of motion. The retractable cable may wind around the winding mechanism in a clockwise direction and may shorten a length of the retractable cable. In a counterclockwise direction, the winding mechanism may lengthen the retractable cable. The solar panel may be attached to a stake and may be mounted in a ground surface. The retractable cable may extend through the solar panel and into the stake, and the stake may provide a notch that may allow the retractable cable to freely extend outside of the stake. The solar panel and the light may be mounted to a roof or a portion of a building. The retractable cable may house an electric current distribution that may be arranged to power the solar light device. The winding mechanism may be inset or internally arranged in the solar panel. A knob may extend from the solar panel and may actuate the winding mechanism. The winding mechanism may automatically retract the retractable cable upon actuation.

Other embodiments of the present disclosure may provide a solar light device that may include a solar panel and two or more lights. The solar panel may have a winding mechanism, and the winding mechanism may be provided to store a retractable cable. The two or more lights may be attached to the solar panel by opposite ends of the retractable cable. The solar panel may be adjustable and may provide a 360-degree range of motion. Each light of the two or more lights may be adjustable and may provide a 360-degree range of motion. The retractable cable may wind around the winding mechanism in a clockwise direction and may shorten a length of the retractable cable. In a counterclockwise direction, the winding mechanism may lengthen the retractable cable. The solar panel may be attached to a stake and may be mounted in a ground surface. The retractable cable may extend through the solar panel and into the stake, and the stake may provide a notch that may allow the retractable cable to freely extend outside of the stake. The solar panel and the two or more lights may be mounted to a roof or a portion of a building. The retractable cable may house an electric current distribution that may be arranged to power the solar light device. The winding mechanism may be inset or internally arranged in the solar panel. A knob may extend from the solar panel and may actuate the winding mechanism. The winding mechanism may automatically retract the retractable cable upon actuation.

Other technical features may be readily apparent to one skilled in the art from the following drawings, descriptions and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Embodiments of the present disclosure generally may provide a solar light device that may include at least one light and a solar panel. The solar panel may include a winding mechanism that may retract a cable. The cable may connect the solar panel and the at least one light, and the cable may be flexible to allow the solar panel to be mounted directly to the at least one light. The cable may run through a stake and/or allow the solar panel and/or the at least one light to be mounted on a building or to another structure.

Figure 1:
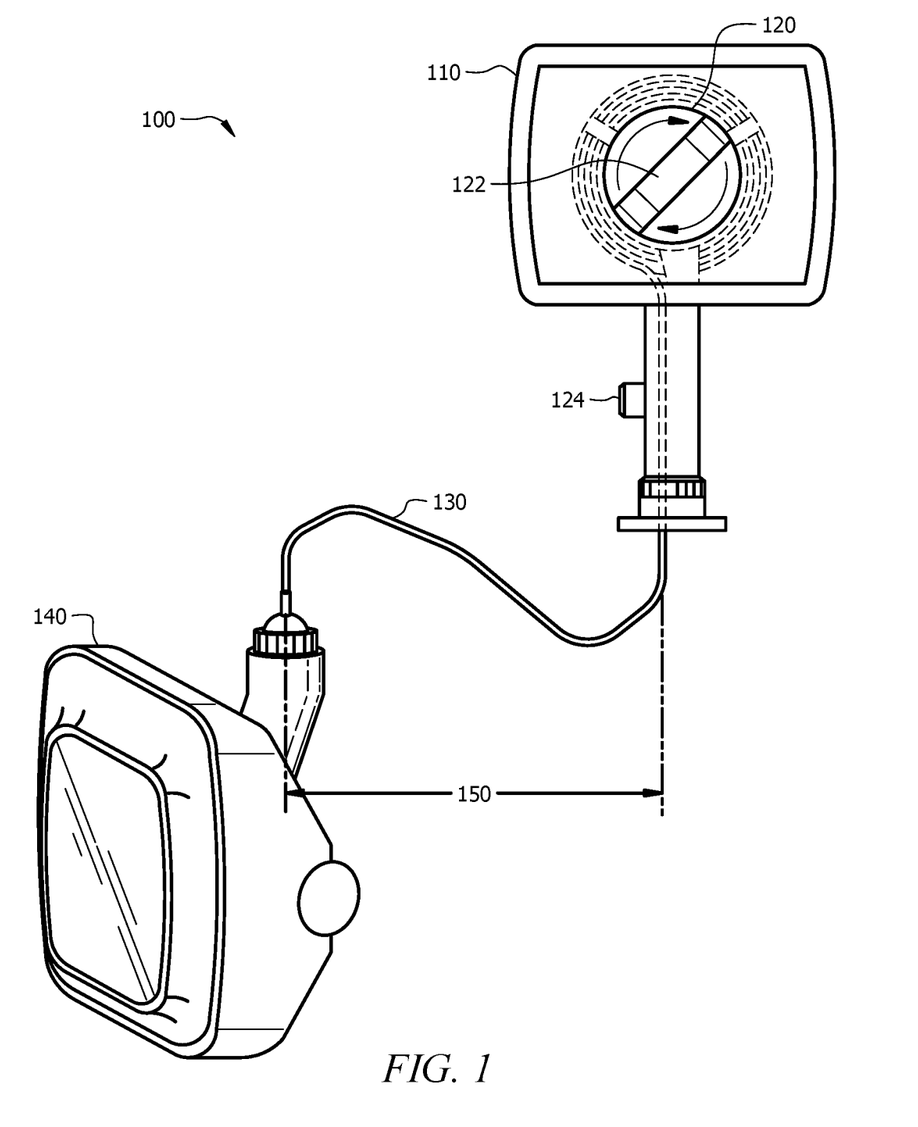
FIG. 1 is a perspective view of a solar light device according to an embodiment of the present disclosure.

FIG. 1 depicts solar light device 100 according to an embodiment of the present disclosure. Solar light device 100 may provide solar panel 110, winding mechanism 120, cable 130, and light 140. Solar panel 110 may include winding mechanism 120 on one side of solar panel 110 that may wind, organize, and store cable 130. A second side or opposite side of solar panel 110 from winding mechanism 120 may include one or more solar cells that may absorb light to produce power for solar light device 100.

It should be appreciated that winding mechanism 120 may be provided on a rear or back side of solar panel 110, and a front side of solar panel 110 may provide one or more solar cells that may absorb light. Winding mechanism 120 may provide a circular or round storage area that may coil cable 130 in a clockwise direction in a plurality of loops for storage. Cable 130 may be retractable inside of winding mechanism 120. Gripping mechanism 122 may be provided by winding mechanism 120 and may allow a user to manually turn winding mechanism 120 in a clockwise and counterclockwise direction. Winding mechanism 120 may prevent cable 130 from being obtrusive and may shorten length 150 of cable 130 when the full length of cable 130 is not needed or required for utilizing solar light device 100. It should be appreciated that length 150 of cable 130 may be a straight length of cable 130 from solar panel 110 to light 140 in an embodiment of the present disclosure. Knob 124 may be provided on solar panel 110 and may actuate winding mechanism 120. Cable 130 may automatically retract inside of winding mechanism 120 upon actuation. It should be appreciated that a spring-loaded and tension mechanism may be provided inside of winding mechanism 120 that may provide automatic retraction of cable 130 inside of winding mechanism 120. However, other actuating mechanisms may be utilized without departing from the present disclosure.

Cable 130 may house components that may provide electric current distribution that may power solar light device 100. Cable 130 may connect solar panel 110 with light 140, and cable 130 may extend through a portion of solar panel 110 in embodiments of the present disclosure. Solar light device 100 may be fully adjustable and may turn, rotate, swivel, and/or rotate in any direction and angle desired by a user.

Solar panel 110 and light 140 may be adjustable and may pivot about one or more axes in embodiments of the present disclosure. It should be appreciated that solar panel 110 may be mounted directly to light 140 or to a roof or a building. It should also be appreciated that solar panel 110 may be mounted underneath a roof. It should further be appreciated that solar light device 100 may be adjusted mechanically and/or electronically. It should be appreciated that light 140 may be a security light or another type of light. It should also be appreciated that any number of lights 140 may be provided by solar light device 100 without departing from the present disclosure.

Figure 2A:
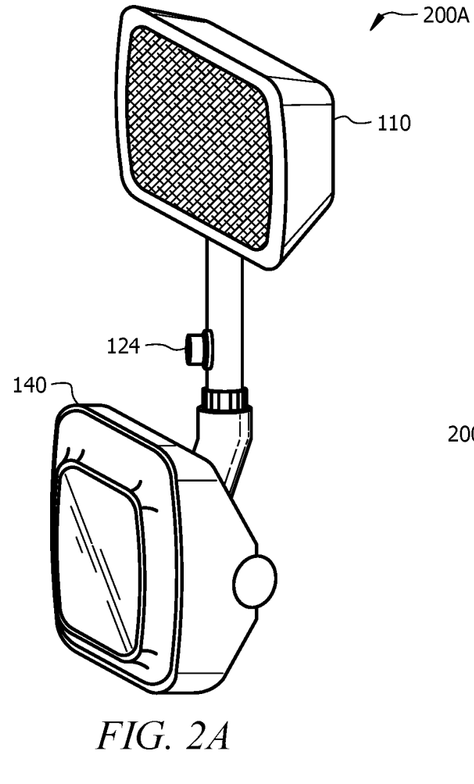
FIG. 2A is a perspective view of a solar light device including a solar panel mounted to a light according to an embodiment of the present disclosure.

FIG. 2A depicts solar light device 200A including solar panel 110 and light 140 according to an embodiment of the present disclosure. Solar panel 110 may be mounted or affixed directly to light 140. It should be appreciated that light 140 may be a security light or another type of light. Solar panel 110 may provide knob 124 that may actuate winding mechanism 120 (FIGS. 1, 2B, 3 and 4) that may retract and lengthen cable 130 (FIGS. 1, 2B, 3 and 4). Light 140 may be mounted to a wall, building, or another type of supporting structure.

Figure 2B:
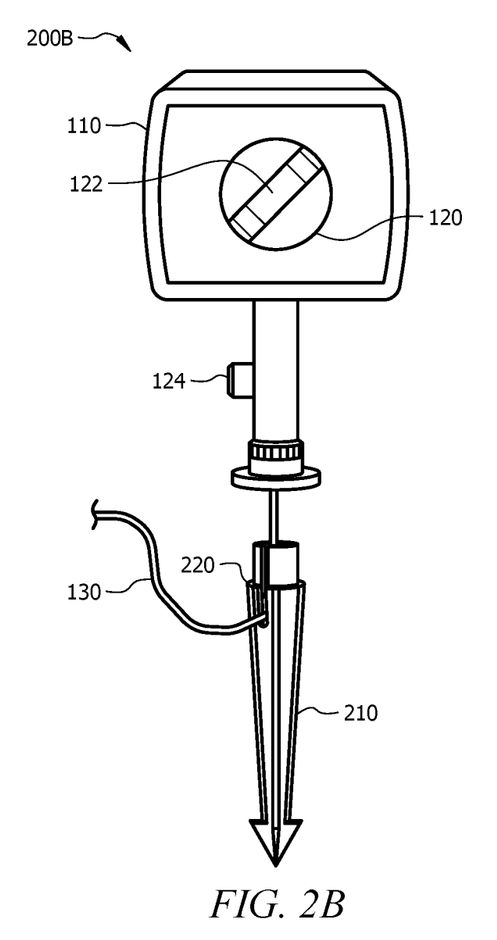
FIG. 2B is a perspective view of a solar light device including a stake attached to a solar panel according to an embodiment of the present disclosure.

FIG. 2B depicts solar light device 200B affixed to stake 210 according to an embodiment of the present disclosure. Using stake 210, solar panel 110 may be secured in the ground, in a lawn, in a flower bed, or in any location desired by a user. Solar panel 110 may be attached to stake 210 using a male-female connection in an embodiment of the present disclosure. Notch 220 may be a slot or opening in stake 210 that may allow cable 130 to freely extend from stake 210. It should be appreciated that cable 130 may extend from a bottom of solar panel 110 and into an opening in stake 210 in embodiments of the present disclosure. Solar panel 110 may provide knob 124 that may actuate winding mechanism 120 to retract and lengthen cable 130. Gripping mechanism 122 may be provided within winding mechanism 120 and may allow a user to manually turn winding mechanism 120 in a clockwise and counterclockwise direction. It should also be appreciated that cable 130 may be connected to one or more lights (not shown).

Figure 2C:
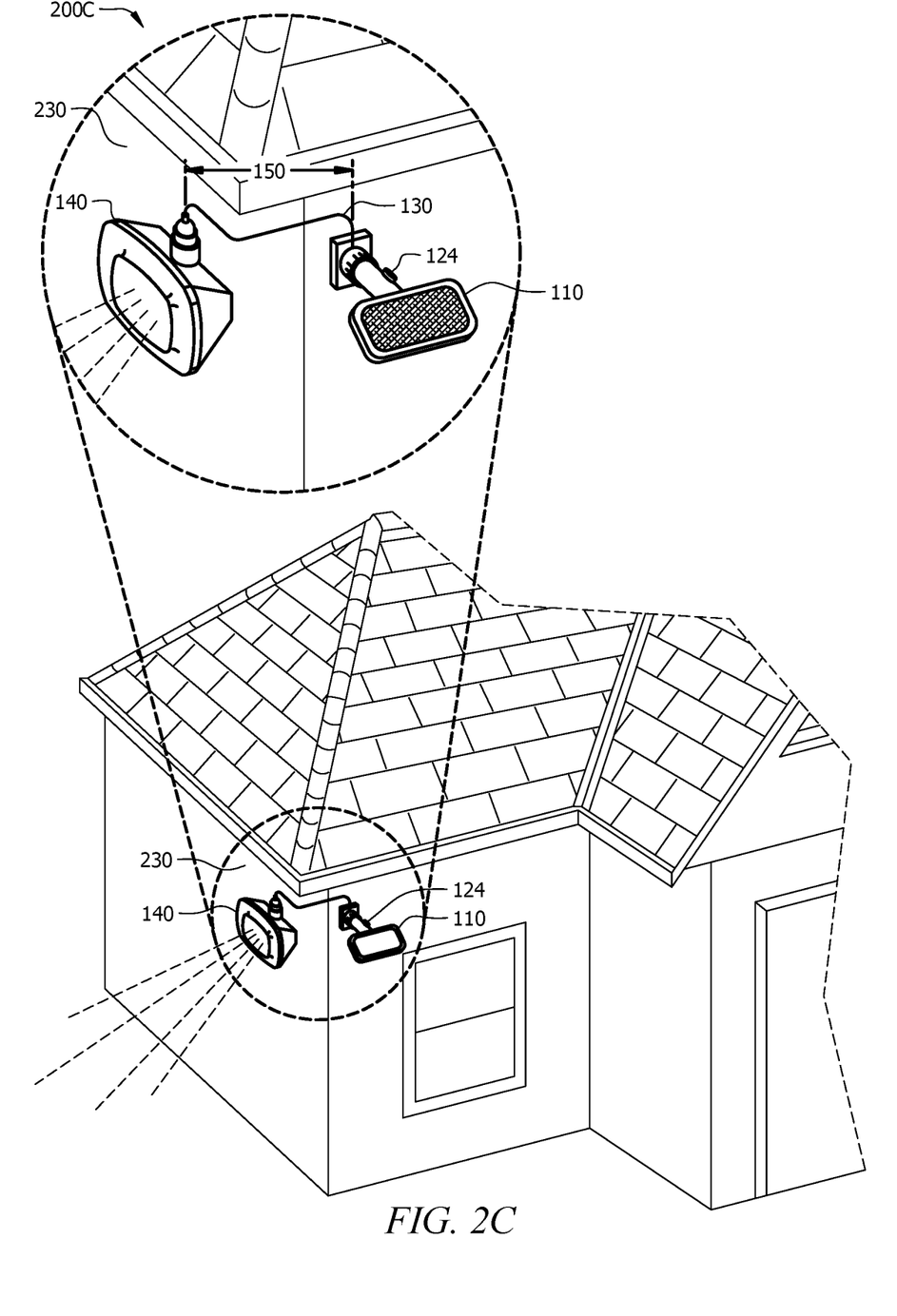
FIG. 2C is a perspective view of a solar light device mounted to a building according to an embodiment of the present disclosure.

FIG. 2C depicts solar light device 200C affixed to building 230 according to an embodiment of the present disclosure. Solar panel 110 may be mounted to a first side of a building, and light 140 may be mounted to a second side of the building adjacent the first side of the building. Cable 130 may be retractable and may connect solar panel 110 and light 140. Solar panel 110 and light 140 may be mounted to any portions or sides of a wall, building, roof, underneath a roof, and to other types of supporting structures without departing from the present disclosure. Cable 130 may house components that may provide electric current distribution and that may connect solar panel 110 with light 140. Distance 150 of cable 130 between solar panel 110 and light 140 may be the shortest distance required or a minimal length to mount or utilize solar light device 200C. Solar panel 110 may provide knob 124 that may actuate winding mechanism 120 that may retract and lengthen cable 130.

Figure 3:
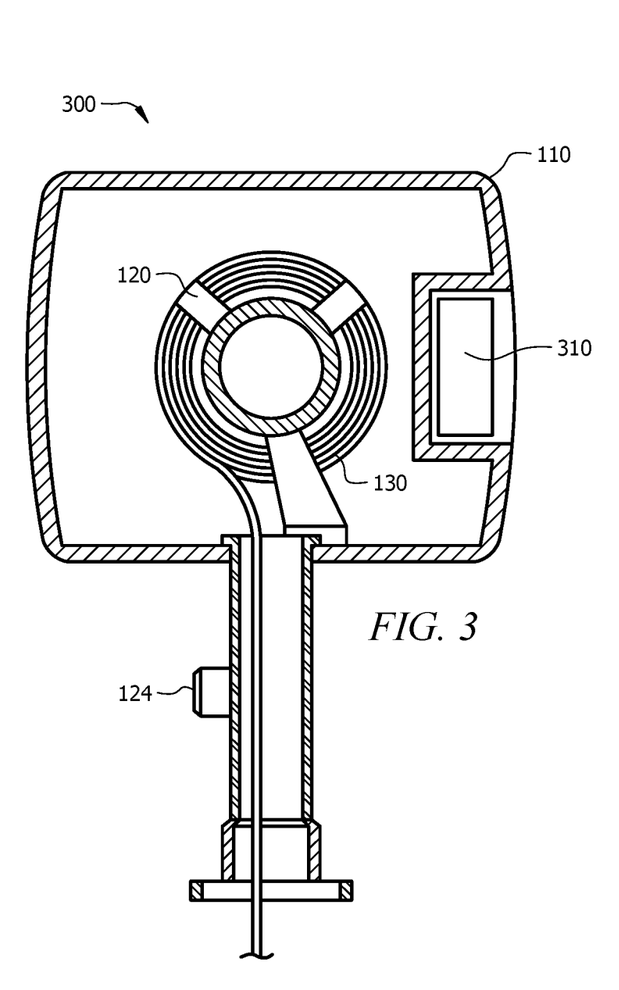
FIG. 3 is a rear view of a solar panel according to an embodiment of the present disclosure.

FIG. 3 depicts solar light device 300 including solar panel 110, winding mechanism 120, cable 130, and power source 310 according to an embodiment of the present disclosure. Winding mechanism 120 may wind, organize, and store cable 130 by utilizing a circular or round storage area. Winding mechanism 120 may coil cable 130 in a clockwise direction in a plurality of loops for storage, and cable 130 may be retractable. Winding mechanism 120 may neatly coil cable 130 inside of solar panel 110 and may shorten and/or lengthen the length of cable 130 in embodiments of the present disclosure. It should be appreciated that a spring-loaded and tension mechanism may be provided inside of winding mechanism 120 that may automatically shorten and/or lengthen the length of cable 130. Solar panel 110 may provide knob 124 that may actuate winding mechanism 120 that may retract and lengthen cable 130.

Solar panel 110 may include power source 310 that may be a battery, which may be portable and/or rechargeable in embodiments of the present disclosure. It should be appreciated that power source 310 may be removable and replaceable in solar panel 110 in embodiments of the present disclosure. It should also be appreciated that power source 310 may be provided in light 140 (FIGS. 1, 2A, 2C, and 4) and/or solar panel 110 without departing from the present disclosure. Cable 130 may house components that may provide electric current distribution and that may electrically connect solar panel 110 to light 140. Distance 150 of cable 130 between solar panel 110 and light 140 may be the shortest distance required or a minimal length to mount or utilize solar light device 100.

Figure 4:
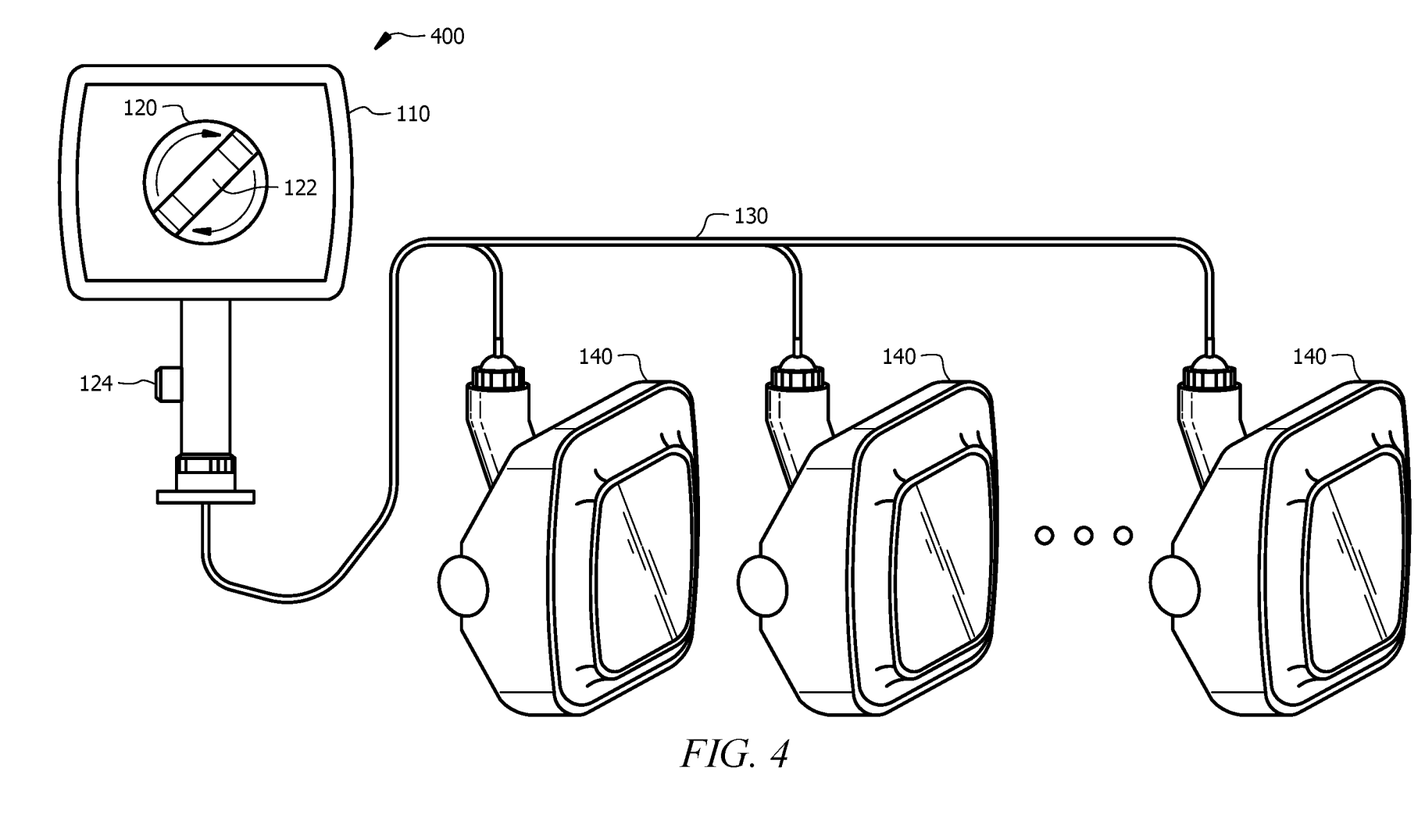
FIG. 4 is a view of a solar light device including a plurality of lights according to an embodiment of the present disclosure.

FIG. 4 depicts solar light device 400 including a plurality of lights 140 according to an embodiment of the present disclosure. Solar light device 400 also may provide solar panel 110, winding mechanism 120, and cable 130. It should be appreciated that two or more lights may be included in the plurality of lights 140 without departing from the present disclosure. Solar panel 110 may include winding mechanism 120 that may wind and store cable 130.

Winding mechanism 120 may provide a circular or round storage area that may coil cable 130 in a clockwise direction in plurality of loops for storage. Cable 130 may be retractable inside of winding mechanism 120. Gripping mechanism 122 may be provided on winding mechanism 120 and may allow a user to manually turn winding mechanism 120 in a clockwise and counterclockwise direction. Winding mechanism 120 may prevent cable 130 from being obtrusive and may shorten the length of cable 130 when the full length of cable 130 is not needed or required for utilizing solar light device 400. Solar panel 110 may provide knob 124 that may actuate winding mechanism 120 that may retract and lengthen cable 130. It should be appreciated that cable 130 may automatically retract inside of winding mechanism 120 upon actuation of winding mechanism 120. It should also be appreciated that a user may stop actuation of cable 130 as desired. Cable 130 may house components that may provide electric current distribution and may electrically connect solar panel 110 to plurality of lights 140.

Solar light device 400 may be fully adjustable and may turn, rotate, swivel, and/or rotate in any direction and angle desired by a user. Solar panel 110 and the plurality of lights 140 may adjustable and may pivot about one or more axes according to embodiments of the present disclosure. It should be appreciated that solar panel 110 may be mounted or affixed directly to at least one light of the plurality of lights 140 or to a roof in embodiments of the present disclosure. It should also be appreciated that solar panel 110 may be mounted underneath a roof. It should be appreciated that the plurality of lights 140 may be mounted to a wall, building, or another type of supporting structure in embodiments of the present disclosure. It should further be appreciated that solar light device 400 may be adjusted mechanically and/or electronically. It should be appreciated that the plurality of lights 140 may be security lights or another type of light.

It should be appreciated that a solar light device according to embodiments of the present disclosure may be adjustable and may provide ambient light, enhanced low light sensitivity, and a timer interval. It should be appreciated that a solar panel according to embodiments of the present disclosure may collect direct sunlight that may power a solar light device and/or components thereof. It should also be appreciated that a solar light device according to embodiments of the present disclosure may include any quantity of solar panels and/or lights without departing from the present disclosure. It should further be appreciated that a solar light device according to embodiments of the present disclosure may provide a body that may be made of metal and/or Acrylonitrile Butadiene Styrene (ABS) plastic. It should be appreciated that a solar light device according to embodiments of the present disclosure may be weather-resistant.

It may be advantageous to set forth definitions of certain words and phrases used in this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A solar light device, comprising:
a retractable cable housing an electric current distribution that powers the solar light device;
a solar panel having a winding mechanism provided on a rear or back side of the solar panel, the winding mechanism winding, organizing, and storing the retractable cable, the winding mechanism comprising:
a circular storage area that coils the retractable cable in a clockwise direction in a plurality of loops for storage; and
a spring-loaded and tension mechanism that provides automatic retraction of the retractable cable inside of the winding mechanism; and
a light attached to the solar panel by opposite ends of the retractable cable, wherein the retractable cable extends through a portion of the solar panel.

2. The solar light device according to claim 1, wherein the solar panel is adjustable and provides a 360-degree range of motion.

3. The solar light device according to claim 1, wherein the light is adjustable and provides a 360-degree range of motion.

4. The solar light device according to claim 1, wherein the retractable cable winds around the winding mechanism in a counterclockwise direction to lengthen the retractable cable.

5. The solar light device according to claim 1, wherein the solar panel is attached to a stake that is mounted in a ground surface.

6. The solar light device according to claim 5, wherein the retractable cable extends into the stake, and wherein the stake provides a notch that allows the retractable cable to freely extend outside of the stake.

7. The solar light device according to claim 1, wherein the solar panel and the light are mounted to a roof or a portion of a building.

8. The solar light device according to claim 1, wherein the winding mechanism is inset or internally arranged in the solar panel.

9. The solar light device according to claim 1, wherein a knob extends from the solar panel and actuates the winding mechanism.

10. A solar light device, comprising:
a retractable cable housing an electric current distribution that powers the solar light device;
a solar panel having a winding mechanism provided on a rear or back side of the solar panel, the winding mechanism winding, organizing, and storing the retractable cable, the winding mechanism comprising:
a circular storage area that coils the retractable cable in a clockwise direction in a plurality of loops for storage; and
a spring-loaded and tension mechanism that provides automatic retraction of the retractable cable inside of the winding mechanism; and
two or more lights attached to the solar panel by opposite ends of the retractable cable, wherein the retractable cable extends through a portion of the solar panel.

11. The solar light device according to claim 10, wherein the solar panel is adjustable and provides a 360-degree range of motion.

12. The solar light device according to claim 10, wherein the two or more lights are each adjustable and provide a 360-degree range of motion.

13. The solar light device according to claim 10, wherein the retractable cable winds around the winding mechanism in a counterclockwise direction to lengthen the retractable cable.

14. The solar light device according to claim 10, wherein the solar panel is attached to a stake that is mounted in a ground surface.

15. The solar light device according to claim 14, wherein the retractable cable extends into the stake, and wherein the stake provides a notch that allows the retractable cable to freely extend outside of the stake.

16. The solar light device according to claim 10, wherein the solar panel and the two or more lights are mounted to a roof or a portion of a building.

17. The solar light device according to claim 10, wherein the winding mechanism is inset or internally arranged in the solar panel.

18. The solar light device according to claim 10, wherein a knob extends from the solar panel and actuates the winding mechanism.

\* \* \* \* \*